United States Patent Office 3,001,912
Patented Sept. 26, 1961

3,001,912
PROCESS FOR THE PRODUCTION
OF BETA-CAROTENE
Guido M. Miescher, Terre Haute, Ind., assignor to Commercial Solvents Corporation, New York, N.Y., a corporation of Maryland
No Drawing. Filed Nov. 17, 1958, Ser. No. 774,125
3 Claims. (Cl. 195—28)

My invention relates to a process for the production of carotenes, and more particularly, to a process for producing beta-carotene.

Ammonium acetate, yeast extract, thiamine, beta-ionone, pantothenic acid, etc., have been introduced into media on which organisms of the order Mucorales are grown to act as precursors of carotenes. Individually, these compounds have increased the yields of carotenes only slightly, if at all.

I have now discovered that various species of the order Mucorales produce greatly increased amounts of beta-carotene when grown on liquid media containing beta-ionone and various carboxyl radical-containing additives.

Among the acids which I have found useful in my invention are acetic acid and glycine. The ammonium, alkali metal, and alkaline earth metal salts of these acids are of equal value in my process. The selection of the desired additive depends upon the initial pH of the medium which should be about pH 5.8 to pH 7. Where a neutral or basic medium, for example, a soybean meal medium, is utilized in my process the free acid can be used to advantage. Where an acid medium, for example, a corn steep medium, is used I prefer to use the more neutral salt additive. Where a salt is utilized in my process I prefer to use the ammonium, sodium or calcium salts.

As the acetate radical is the component of my carboxy additives which are utilized by the microorganism in forming β-carotene I have found that amounts of acids and salts having an acetate equivalence of about 0.1 to about 1% by weight are useful in my process. I prefer to utilize a concentration of carboxy additive, such as an acetate or its biological equivalent, of about 0.3 to about 0.6%, as I have found economically optimum synergism is obtained at this acetate concentration.

Generally, I add from about 0.05% to about 0.3% β-ionone by volume to the fermentation medium during the course of the fermentation. Preferably, I add β-ionone to the fermenting medium after about 18 hours, as the compound is volatile and is not consumed to any extent until there is an appreciable amount of mycelium in the fermentor. For this reason I prefer to add the β-ionone to the fermenting medium about 30 to 48 hours after the fermentation is started. If the β-ionone is added during this period economically optimum synergism is obtained with about 0.05–0.15% by volume β-ionone.

Many fermentation media are known to be useful for cultivating microorganisms of the order Mucorales. Any of these media may be used in my invention wherein an organism of the order Mucorales is cultivated under submerged conditions of agitation and aeration at about 20–34° C. I have found that optimum growth occurs at about 28–30° C. Any nutrient medium consisting of a carbohydrate source, such as sugars, starch, glycerol; a nitrogen source, such as ammonia, soybean meal, wheat gluten, cottonseed meal, lactalbumin, caesin, etc.; mineral salts, such as potassium phosphate, magnesium sulfate, calcium carbonate, etc.; trace elements, such as iron, magnesium, copper, zinc, cobalt, etc.; animal or vegetable oils; vitamins, such as thiamine, vitamin $B_{12}$, etc., known to be useful in cultivating organisms of the order Mu-corale, are operable in my invention. After growth has been completed, the mycelium is separated from the broth, dried, and the beta-carotene is recovered by known means.

Microorganisms from the order Mucorales which I have found to produce large amounts of beta-carotene by my new process include *Choanephora cucurbitarum, C. trispora, C. conjuncta, Blakeslea circinans, Phycomyces blakesleeanus, Mucor hiemalis*, etc.

Not only does the process of my invention give increased amounts of carotenes generally, it also increases the amounts of beta-carotene formed so that substantially pure beta-carotene can be recovered with a minimum of purification. The following specific examples are set out to more fully illustrate my invention, but it is not intended that my invention be limited to the microorganisms, process, or media used, but rather it is intended that all equivalents obvious to those skilled in the art be included within the scope of my invention as claimed.

Example I

To demonstrate the effectiveness of my new process twelve 500 ml. Erlenmeyer flasks were filled with the following medium:

| | Percent |
|---|---|
| Cerelose | 4 |
| Corn steep liquor | 3 |
| Caesin | 0.4 |
| $K_2HPO_4$ | 0.1 |
| Corn oil | 1.5 |
| Tween 81 (non-ionic detergent) | 0.3 |
| pH adjusted with ammonia and water to volume to pH | 6.2 |

To six of the flasks 0.6% ammonium acetate was added. The flasks were inoculated with a 5% inoculum of *C. trispora* (+) strain, N.R.R.L. #2456, and a 5% inoculum of *C. trispora* (−) strain, N.R.R.L. #2457, and were put on a rotary shaker and rotated at 200 r.p.m. and 28° C. temperature during the fermentation period. After the medium had fermented for 48 hours sufficient β-ionone to comprise 0.13% of the total medium was added to six of the flasks, three containing acetate and three containing the basal medium. The fermentation was continued for an additional 48 hours, at which time the pH was 7.7. The medium was then steamed and afterwards filtered. The filter cake, mostly mycelium, was dried. A known amount of the dried filter cake was powdered in a tissue grinder in the presence of benzene. The carotene-benzene solution was diluted and assayed for carotene in a spectrophotometer at 460 mμ. The following table sets out the yields of β-carotene in the basal medium, in the basal medium containing acetate, in the basal medium containing β-ionone, and in the basal medium containing both acetate and β-ionone.

| Medium | Basal | Basal+ Acetate | Basal+ β-Ionone | Basal+ Acetate and β-Ionone |
|---|---|---|---|---|
| Yield [1] | 0.5 | 1.5 | 0.5 | 8 |

[1] Mg. β-carotene/gm. mycelium.

Example II

A 14 liter portion of the basal medium of Example I to which 0.4% glycine had been added was sterilized and placed in a 20 liter fermentor maintained at 28° C. The medium was inoculated with 5% *C. trispora* (+) strain, N.R.R.L. #2456, and 5% *C. trispora* (−) strain, N.R.R.L. #2457. Air was passed through the medium at the rate of 15 liters per minute. Added agitation was provided by one 6" impeller at 250 r.p.m. After the fermentation had been in progress 45 hours sufficient β-ionone to comprise 0.15% of the total medium was added to the fermenting medium. The fermentation was stopped at 120 hours, the mycelium filtered from the broth, and processed as described above. The mycelium assayed 4.5 mg. of β-carotene per gram of mycelium.

*Example III*

Acetic acid, 0.35% by volume, was added to 14 liters of the following medium contained in a 20 liter fermentor:

| | |
|---|---|
| Acid hydrolyzed corn _____percent__ | 7 |
| Acid hydrolyzed casein _____do____ | 0.2 |
| $KH_2PO_4$ _____do____ | 0.05 |
| Thiamine·hydrochloride _____mg./l__ | 1.0 |
| Tween 81_____percent__ | 0.15 |
| Corn oil_____do____ | 1.5 |

NaOH and water to volume to adjust the pH to 6.2.

The medium was stirilized, then cooled to 30° C. and inoculated with 5% *Blakeslea circinans* (+) strain, N.R.R.L. #2546, and 5% *Blakeslea circinans* (−) strain, N.R.R.L. #2548. The medium was aerated and agitated as described in Example II. At the end of 48 hours 0.15% β-ionone was added. At the end of 100 hours the fermentation was stopped, the mycelium recovered, dried, and assayed for β-carotene. The product was found to contain 3.9 mg. carotene per gram of mycelium.

Now having described my invention what I claim is:

1. In a process for the production of β-carotene, by cultivation of + and − strains of the microorganism *Choanephora trispora* in an aerated liquid nutrient medium, the step which consists of cultivating the microorganism in an aerated liquid nutrient medium to which from about 0.05 to 0.3% by volume β-ionone and from about 0.1 to about 1.0% by weight of an acetate equivalent of a carboxy additive selected from the group consisting of acetic acid and glycine and the ammonium, alkali metal and alkaline earth metal salts thereof have been added.

2. The process of claim 1 wherein the β-ionone is added to the fermentation medium from 18 to 48 hours after inoculation of the medium with the microorganism.

3. The process of claim 1 wherein the β-ionone is added to the fermentation medium from about 30 to 48 hours after inoculation of the medium with the microorganism.

References Cited in the file of this patent

UNITED STATES PATENTS

| | | |
|---|---|---|
| 2,865,814 | Hesseltine et al. | Dec. 23, 1958 |
| 2,890,989 | Anderson | June 16, 1959 |

OTHER REFERENCES

Bessey: Morphology and Taxonomy of Fungi, The Blakiston Co., 1950, Philadelphia, pp. 155, 167–8, 185.

Annual Review of Biochemistry (1952), vol. 21, pp. 487–490.

Annual Review of Biochemistry (1953), vol. 22, page 531.

Eckey: "Vegetable Fats and Oils," Reinhold Publishing Corp., New York, 1954, page 622.

Annual Review of Biochemistry (1955), vol. 24, pp. 510–515.

Barnett et al.: Science, vol. 123, No. 3187, January 27, 1956, page 141.